United States Patent Office 3,201,461
Patented Aug. 17, 1965

3,201,461
ALKYLHALONAPHTHALENE SULFONATES
Alfred F. Steinhauer, Midland, and Dale G. Brown, Beaverton, Mich., assignors to The Dow Chemical Company, Midland, Mich., a corporation of Delaware
No Drawing. Filed May 1, 1961, Ser. No. 106,446
3 Claims. (Cl. 260—505)

This invention relates to new compositions of matter comprising alkylhalonaphthalene sulfonates and to methods for making and using such compositions.

The alkylhalonaphthalene sulfonates of the invention are those containing an alkyl radical of about 8 to 18 carbon atoms, one or two halogen substituents on the naphthalene nucleus, said halogens being chlorine, bromine or iodine or a combination thereof, and one to two nuclear sulfonate substitutents. The cation associated with the sulfonate groups may be hydrogen, an alkali or alkaline earth metal or any solubilizing cation. Suitable non-metallic cation include ammonium, alkylammonium and hydroxyalkylammonium ions wherein there are one to 3 alkyl groups.

The compounds of the invention are potent surfactants and are therefore useful as detergents and wetting, dispersing and emulsifying agents, etc. In addition, they are powerful bactericides, being effective at concentrations of only a few parts per million against certain harmful micro-organisms. By taking advantage of both properties it is thus possible to formulate cleaning and sanitizing compositions in which a single active ingredient acts both as surfactant and as bactericide.

The compounds of the invention can be conveniently made by halogenating, alkylating and sulfonating naphthalene, each of these steps being separately well known in the art. While they are preferably carried out in the order named, they can be effected in any desired order and with any appropriate known reactants, catalysts and procedures. The monohalonaphthalenes are well known and need not be further discussed. Any monohalonaphthalene can be used for the alkylations step and any known alkylation catalyst and reactant can be used. A preferred method comprises reaction with a polypropylene or polybutylene containing 8 to 18 carbon atoms in the presence of a Friedel-Crafts catalyst, such as aluminum chloride. The alkylhalonaphthalene thus obtained can be sulfonated by any known nuclear sulfonation process, a preferred method comprising reaction with sulfur trioxide or oleum. As is well known, a more vigorous sulfonation is required to produce a disulfonate than to produce a monosulfonate. The sulfonated alkylhalonaphthalene can be neutralized with any desired base and the resulting salts can be converted to other salts by any of the known methods for effecting such transformations. For reasons of convenience and economy we prefer the alkali metal salts, particularly the sodium and potassium salts. Any salt having the necessary solubility can be used in our surfactant and/or bactericidal compositions, the essential activity of the products not being greatly affected by the identity of the associated cation.

The practice of the invention is illustrated by the following examples.

EXAMPLE 1

(a) Preparation of dodecylchloronaphthalene 1-chloronaphthalene (750.4 g.) and aluminum chloride (53.2 g.) were placed in a reactor and heated to 60° C. with stirring. Tetrapropylene (336 g.) was then added drop-wise over a period of 90 minutes, after which stirring and heating at 90° were continued for an additional 90 minutes. Aqueous 30% NaOH was then added and the organic layer was separated and distilled, thus yielding 182 g. of product boiling at 112–161° C. (0.3 mm.).

(b) Monosulfonation

A 33.1 g. portion of the dodecylchloronaphthalene produced above was dissolved in 100 ml. of methylene chloride and sulfonated by adding 43 g. of 24.25% oleum over a 15-minute period. After standing for another 15 minutes the sulfuric acid layer was separated and discarded. The methylene chloride layer was stirred with 100 ml. of water, made alkaline to PH 10 by addition of aqueous NaOH, separated from the water, dried, and the solvent was evaporated, thus leaving a light yellow powder consisting essentially of sodium dodecylchloronaphthalene sulfonate.

(c) Disulfonation

A 33.1 g. portion of the dodecylchloronaphthalene prepared in part (a), above, was dissolved in 100 ml. of methylene chloride and sulfonated by the addition of a solution of 17.6 g. of sulfur trioxide in 50 ml. of methylene chloride. After working up the product as described in part (b) there was obtained a powder consisting essentially of disodium dodecylchloronaphthalene disulfonate.

Various homologs and analogs of the above products as shown hereinafter were made by obvious modifications of the processes described above. They were soluble in water, perchloroethylene, and Stoddard solvent up to concentrations of at least 2%.

The compounds of the invention have been found to have potent bacteriostatic or bactericidal action at concentrations of only a few parts per million against a variety of common harmful micro-organisms. For comparative purposes a number of standardized test were run in which various compounds at several concentrations were tested for activity against Staph. aureus. In these tests, the compound was incorporated at the specified concentration (parts per million) into AOAC broth and culture tubes containing the broth were inoculated with a 24-hour culture of Micrococcus pyogenes var. aureus, Strain No. 209. The tubes were incubated at 37° C. for 48 hours and then read for growth (cloudy) or no growth (clear). Otherwise clear tubes containing a visible sediment were read as borderline. Table I shows the results of a series of such tests. The compounds were tested in the form of their sodium salts.

TABLE I

| Ex. | Naphthalene Derivative | Inhibition of Staph. aureus Activity [1] (p.p.m.) | | |
|---|---|---|---|---|
| | | − | ± | + |
| 1(b) | Dodecylchloro monosulfonate | 7 | 6 | 5 |
| 1(c) | Dodecylchloro disulfonate | 10 | 7.5 | 5 |
| 2 | Nonylchloro monosulfonate | 25 | | 10 |
| 3 | Dodecylbromo monosulfonate | 7.5 | | 5 |
| 4 | Dodecyldichloro monosulfonate | 10 | 7.5 | 5 |

[1] += Growth; ±=Borderline; −=No growth.

In contrast to the above results, when potassium isobutylchloronaphthalene monosulfonate was tested in the same way in concentrations up to 50 p.p.m., growth was observed in all tests.

We claim:
1. A product selected from the group consisting of the alkylhalonaphthalenesulfonic acid made by
   (1) alkylating a 1-halonaphthalene wherein the halogen has an atomic number from 17 to 53, thus to form a monoalkyl-1-halonaphthalene wherein the alkyl radical contains 8-19 carbon atoms and

(2) sulfonating said monoalkyl-1-halonaphathalene, thus to form a monoalkyl-1-halonaphthalenesulfonic acid containing 1 to 2 sulfonic acid groups and the alkali and alkaline earth metal salts thereof.

2. Compounds as defined in claim 1 wherein the alkyl group is dodecyl.

3. Compounds as defined in claim 1 wherein the halogen is chlorine.

References Cited by the Examiner

UNITED STATES PATENTS

| | | | |
|---|---|---|---|
| 1,232,187 | 7/17 | Bechhold | 167—32 |
| 1,691,228 | 11/28 | Daimler et al. | 260—505 |
| 2,072,153 | 3/37 | Bruson et al. | 260—505 |
| 2,161,173 | 6/39 | Kyrides | 260—505 |
| 2,410,497 | 11/46 | Hentrich | 167—32 |
| 2,471,265 | 5/49 | Dreisbach | 167—24 |
| 2,499,578 | 3/50 | Flett | 260—505 |
| 2,764,548 | 9/56 | King et al. | 252—33 |
| 2,864,742 | 12/58 | Whetstone | 167—32 |

OTHER REFERENCES

Yoshida et al.: Chem. Abstract, vol. 47, col. 2261g (1953); vol. 49, col. 11,083c (1955).

Suzuki (Japan), 34–9581, Oct. 27, 1959 (2 pages), (abstrated in Chem. Abstracts, vol. 54, 1960, col. 6671).

LORRAINE A. WEINBERGER, *Primary Examiner.*

LEON ZITVER, *Examiner.*

UNITED STATES PATENT OFFICE
CERTIFICATE OF CORRECTION

Patent No. 3,201,461                            August 17, 1965

Alfred F. Steinhauer et al.

It is hereby certified that error appears in the above numbered patent requiring correction and that the said Letters Patent should read as corrected below.

Column 2, line 72, for "8-19" read -- 8-18 --.

Signed and sealed this 26th day of July 1966.

(SEAL)
Attest:

ERNEST W. SWIDER
Attesting Officer

EDWARD J. BRENNER
Commissioner of Patents